United States Patent [19]

Wilkinson

[11] 4,208,018
[45] Jun. 17, 1980

[54] METHOD AND APPARATUS FOR WINDING AN ENDLESS TAPE

[75] Inventor: John N. Wilkinson, Bradbury, Calif.

[73] Assignee: Optical Radiation Corporation, Azusa, Calif.

[21] Appl. No.: 963,981

[22] Filed: Nov. 27, 1978

[51] Int. Cl.² .............................................. B65H 17/48
[52] U.S. Cl. ................................ 242/55.19 R; 352/128
[58] Field of Search ................ 242/55.19 R, 55.19 A, 242/55.18, 77.1; 352/128, 126

[56] References Cited

U.S. PATENT DOCUMENTS

| | | | |
|---|---|---|---|
| 2,990,128 | 6/1961 | Hansen et al. | 242/77.1 |
| 3,661,337 | 5/1972 | Burth | 242/55.19 R |
| 3,677,628 | 7/1972 | Walker | 352/128 |
| 3,722,809 | 3/1973 | Leisring | 242/55.19 R |
| 4,010,910 | 3/1977 | Boudouris et al. | 242/55.18 |
| 4,066,221 | 1/1978 | Johnson | 242/55.19 A |

Primary Examiner—Billy S. Taylor
Attorney, Agent, or Firm—Christie, Parker & Hale

[57] ABSTRACT

Tape is wound on edge on top of a turntable and is held in place against the table by equally spaced pressure pads that extend radially to restrict circumferential movement of the tape across the respective radius while permitting movement along the radius. An agitator is mounted adjacent the periphery of the turntable to contact the outer layer of the tape on each side of a pressure pad and moves in an arc while in contact with the tape toward the center of the table and in the direction of the turntable to aid in forming scallops in the tape between adjacent pressure pads. The length of tape applied to the table for each revolution thereof is controlled and is either one of two selected lengths or a length between the two selected lengths. The length is changed in response to the instantaneous length of tape between a feed mechanism and the point of application of the tape to the table. The take-off point is controlled to prevent scratching of the tape by causing a control signal to be developed when the tape is removed from outside a selected area and activating the movable roller of an accumulator in response to the control signal to move the take-off point back within the selected area.

17 Claims, 8 Drawing Figures

METHOD AND APPARATUS FOR WINDING AN ENDLESS TAPE

CROSS-REFERENCE TO RELATED APPLICATIONS

The invention of this application is related to the invention disclosed in U.S. Pat. No. 4,066,221 and in U.S. applications Ser. Nos. 844,469 and 844,471 (now abandoned), both filed Oct. 21, 1977, and constitutes improvements on the inventions disclosed therein.

BACKGROUND OF THE INVENTION

The invention relates generally to a method of and apparatus for the loading and use of turntables in the rendition of taped programs, and more particularly in the loading and use of a single turntable on which the tape of a taped program is wound on in controlled lengths per revolution of the turntable near the periphery of the turntable and off near the center of the turntable simultaneously.

Heretofore, the tape of a taped program of the length of a movie, television show, or musical show, has been loaded on a turntable by winding it from the center outward, thereby varying the length of tape per revolution of the turntable directly with the radius of the winding. The outer end of the tape is led through an associated apparatus for the rendition of the taped program, and out to be rewound from the center outward on a second turntable. When the program ends, it can be replayed from the second turntable back onto the first turntable. The two turntables are required because they must turn at varying speeds to deliver and take up tape at a constant linear rate from turntable windings of varying radii.

Also, in the prior art where one turntable has been employed, winding tape from the center of a reel through a cooperating apparatus for the rendition of the taped program and peripherally rewinding it back on the same reel has necessarily been confined to very short lengths of tape loosely wound to allow for slippage and friction between windings due to the reel turning several times to deliver from the center the same lengths of tape that are peripherally taken up in less than one revolution.

A substantially improved method and apparatus for the loading and use of a single turntable in the rendition of taped programs is disclosed in U.S. Pat. No. 4,066,221 and the continuation application of the application of this patent, Ser. No. 844,471, filed Oct. 21, 1977, and the continuation-in-part application Ser. No. 844,469, filed Oct. 21, 1977. In the method and apparatus of this patent and applications, the tape is wound on edge on top of the single turntable and is held in place against the table by equally spaced pressure pads that extend radially to restrict circumferential movement of the tape across the respective radius, while permitting movement along the radius. In applying this basic concept, it was contemplated that equal lengths of tape for each revolution of the turntable would be wound onto the turntable. However, it has been found that where a plurality of tapes have been spliced together to make up a selected program, the characteristics of the individual tapes, such as thickness and stretchiness, may preclude the use of this concept of equal lengths for every revolution of the turntable throughout the entire program.

Additionally, where many hours of film are stored on a table and the film is continuously removed from the inner loop and wound on at the outer loop, forces such, for example, as are caused by the spring forces of the film on the table, may build up and cause a change in the circumference of the tape on the table. Such forces may make it impossible to hold the desired outer circumference of film. Furthermore, these forces may have an adverse effect on the desired symmetry of the scallops formed in the inner loops of the stored tape between adjacent radii.

SUMMARY OF THE INVENTION

To overcome the problems of the prior art including the build up of forces, encountered while using the concept of holding the tape on edge against circumferential movement across selected radii while permitting movement along the radii, a means for aiding in the formation of scallops, and preferably substantially uniform scallops between adjacent radii, is employed. These means prevent the build up of the forces on the table by breaking up these forces around each radii. Such a means is positioned adjacent the outer periphery of the turntable and agitates the tape on each side of each selected radius as it passes by the position of the agitator.

Additionally, or alternatively, the length of tape per revolution wound onto the turntable is controlled. One approach is to alternately apply a first selected length per revolution for a first interval of time and then a second selected length per revolution for a second interval of time in response to the movement of an accumulator handling the tape preceding the winding of the tape on the turntable. The change from one length to the other may be gradual or nearly instantaneous.

Another approach is to apply a certain length per revolution between limits in response to a closed-loop control having a control signal derived from the accumulator.

Also, variations in speed between the turntable and the rendition equipment for the taped program may be compensated for by controlling the speed of the turntable and feed mechanism in response to the difference in tape speed caused by the rendition equipment and that caused by the turntable and feed mechanism.

Additionally, the take-off point from the center of the turntable is controllable to prevent scratching of the tape that may occur where the take-off point moves around to where one layer of the tape is sliding over another layer. Sensors are positioned near the center of the table to sense movement of the tape outside a selected area. An adjustable accumulator moves the take-off point in response to an output from these sensors, to keep the take-off point within the selected area.

DETAILED DESCRIPTION

Figure 1:
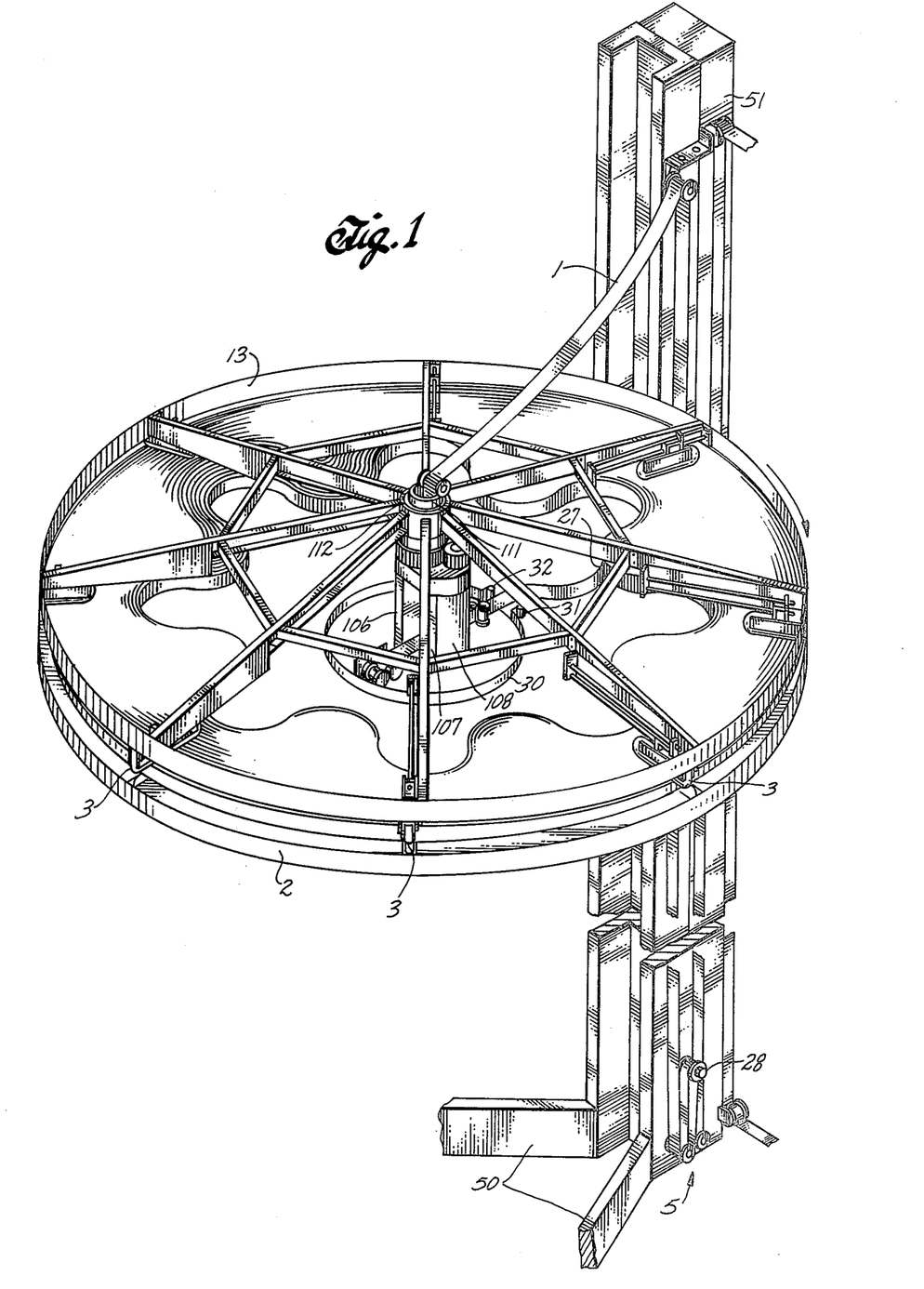
FIG. 1 is a three-dimensional view from top and side of a turntable of the invention.

As shown in FIG. 1, the tape 1 is stored on a single turntable 2 on edge between a plurality of pressure pads 3 and the turntable 2. Each pressure pad 3 extends along a radius of the turntable and holds the tape against the table 2 so that the tape will not move circumferentially across each radius but will be permitted to move radially along each radius.

In accordance with this invention, the length of each layer of tape stored on the table is controlled to compensate for variations in the various parameters of the tape such as thickness, laminations and stretchiness, for example, which differ from the storage of tape in the prior art devices such as those disclosed in U.S. Pat. No. 4,066,221. In U.S. Pat. No. 4,066,221 the tape is stored on the table by applying equal lengths of tape for each layer of tape stored. It should be noted that for purposes of this application "tape" includes motion picture film, video tape and magnetic tape, and a "taped program" includes any transscription thereon for rendition therefrom.

In addition to controlling the length of the tape of each layer stored on the table 2, means is provided in accordance with this invention for aiding in the formation of the scallops of the inner loops of the tape between the adjacent radii along which the tape is supported. The means for aiding in the formation of the scallops may be employed independently of the controlling of the length of the tape stored on the table, or may be employed in conjunction with the variation in the length of the tape stored on the table.

As noted above, the prior art devices, and in particular the device disclosed in U.S. Pat. No. 4,066,221, may be advantageously employed where there is a single configuration of tape being stored on the table. However, problems have been experienced when attempting to use the device disclosed in U.S. Pat. No. 4,066,221 for the storing of film and, in particular, the storing of a large amount of film such as is required in producing a 4½-hour movie program. It has been found that when combining film for a lengthy program such as 4½ hours, characteristics such as thickness and stretchiness of the individual lengths of film may differ so that in many instances it has not been possible to store a combination of film in accordance with the apparatus and method disclosed in U.S. Pat. No. 4,066,221.

Additionally, forces have been experienced when storing a large amount of flim, such as is required for a 4½-hour movie program, that tend to push the film outward on the table, thereby causing an undesirable change in the outer circumference. Also, there forces tend to distort the scallops formed between adjacent radii associated with the means for holding the tape along the selected radii. The forces, and thus the distortion and change, may become so great as to render the equipment inoperable.

Figure 2:
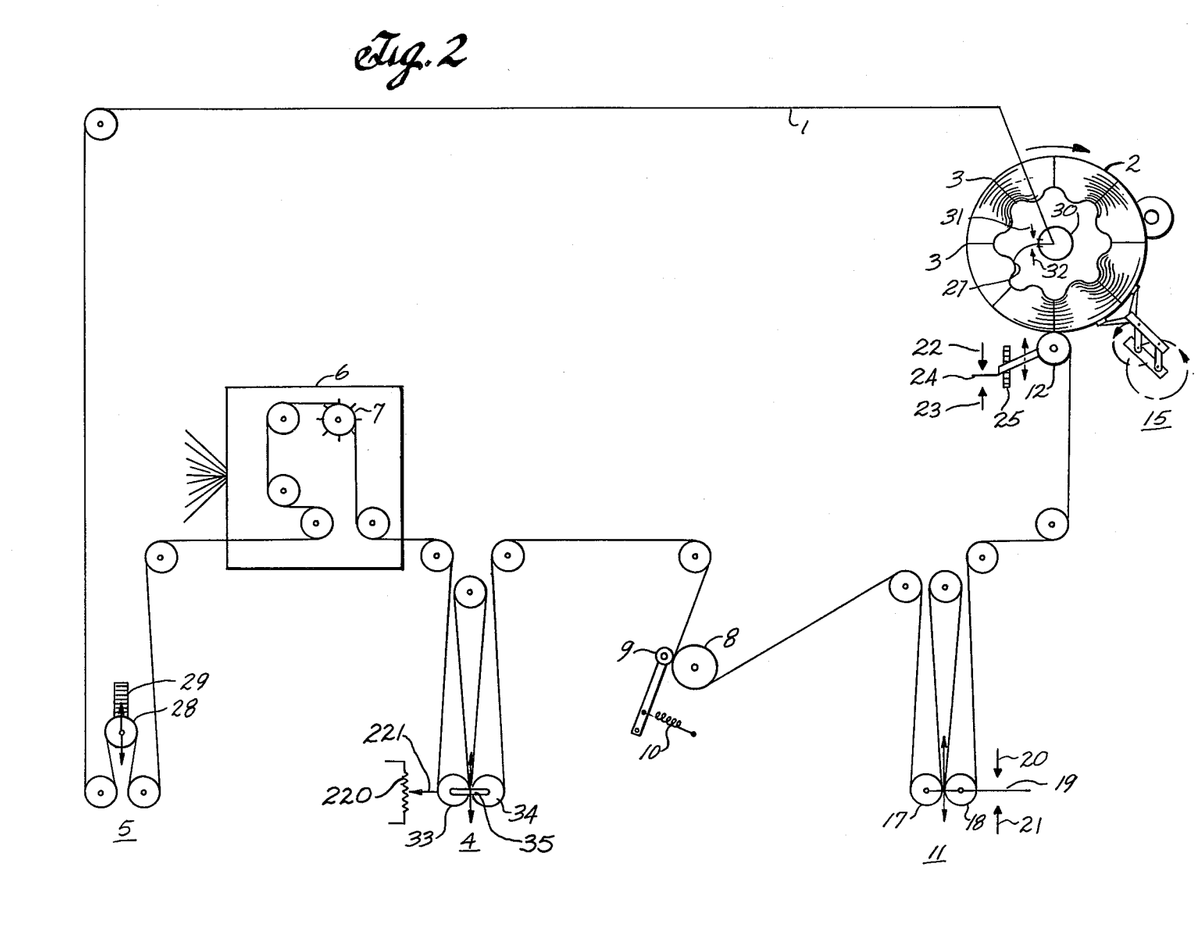
FIG. 2 is a schematic flow diagram of the handling of the tape that is wound on and taken off of the turntable of FIG. 1 in accordance with this invention.

To overcome the problems that have been encountered, a number of things may be done as shown in the schematic flow diagram of FIG. 2. For purposes of illustration, it will be assumed that the tape being stored on the turntable is to be employed in a movie projector and is, therefore, movie film. However, it is to be noted that the tape may be other than movie film and the apparatus employing the tape may be other than a movie projector.

In the flow diagram of FIG. 2, the tape 1 is stored on a turntable 2 and is held in place on edge against the turntable by radial arms 3 which are, preferably, equally spaced. The tape 1 is removed from the center portion of the turntable 2 and travels through an accumulator 5 to a projector 6. The tape 1 is pulled from the table 2 by the sprocket wheel 7 of the projector 6. The rendition apparatus in the form of projector 6 recovers the information stored on the tape as the tape is passed through the projector 6. The tape is then picked up and pulled by a capstan drive 8 through a second accumulator 4. The capstan 8 operates in cooperation with a pinch roller 9 held against the capstan 8 by a spring tension provided by a spring 10. As the turntable 2 rotates, it pulls the tape from the downward side of the capstan 8 through a third accumulator 11 and past a layup roller 12 which controls the position at which the tape is applied to and stored on the table 2.

It has been found that in storing the tape 1 on turntable 2 on edge between pressure pads and the table, the circumference of the tape is more easily controlled if the scallops between the radially extending pressure pads are substantially uniform. Thus, to aid in the formation of the scallops and the breaking up of the forces that are inherent in the storing of film spirally on a table, an agitator 15 is provided adjacent the turntable 2. Agitator 15 contacts the outer layer or loop of the tape 1 on either side of a radial pressure pad and adjacent to the radial pressure pad and pushes the tape in a manner to aid in the formation of the scallops on the inner loops of the tape stored on the turntable 2 and to break up the undesired forces.

It has also been found that, independent of the agitator 15, although useful in cooperation with the agitator, a movable layup roller 12 is helpful in controlling the circumference of the tape that is stored on the table 2. The movement of the movable layup roller 12 is controlled by movement of the accumulator 11. As schematically shown in FIG. 2, the bottom two rollers 17 and 18 of accumulator 11 move up and down and, during the travel of these rollers, an arm 19 contacts a microswitch 20 or a microswitch 21. Upon contact of either of these microswitches, a motor is energized to move the movable layup roller 12 between its two limits which are determined by the position of microswitches 22 and 23 relative to an arm 24 attached to the movable layup roller 12. The accumulator 11 maintains a constant tension on the tape between the layup roller 12 and the capstan 8 while taking up excess tape at the output of capstan 8 or feeding tape to layup roller 12 as required to efficiently and effectively store tape on the turntable 2 independent of the characteristics of the individual lengths of tape being stored.

The movable layup roller 12 may be substantially instantaneously moved between its two extreme positions or may be moved linearly between these two extreme positions by use of a lead screw, such as the one schematically shown in FIG. 2 and identified as lead screw 25.

Since the movable layup roller 12 applies the tape to the table at different radii, the length of the tape per revolution of the turntable 2 will vary between the two lengths established by the two extreme limits of the movable layup roller 12. Consequently, the take-off point 27 from the inner loop or layer of tape will vary between two limits also. The take-off point 27 may be initially adjusted by adjusting the movable roller 28 of accumulator 5. Since it is possible that the take-off point 27 may vary beyond the acceptable take-off point because of variations in the characteristics of the tape being stored or the mechanical system employed, it is desirable to control the limits of the variation of the take-off point. If the limits of the variation of the take-off point 27 are not controlled, it is possible that the take-off point may move around to a point where the tape would be pulled against another layer of tape or against the inner circle 30 of the table 2, so that it may become scratched. Consequently, microswitches 31 and 32 are provided to establish limits for the movement of the take-off point 27. The microswitches 31 and 32 control the operation of a mechanical device, such as lead screw 29 for example, that will move the movable roller 28 of accumulator 5 in a manner to keep the take-off point 27 within the desired and proper area.

In the presently preferred embodiment of the method and apparatus of storing tape, the movement of the turntable 2, agitator 15 and capstan 8 is synchronized. For this purpose a change in speed of the turntable 2 also causes a change in the rotational speed of the capstan 8 and the movement of the agitator 15.

In operation the rendition equipment, such as projector 6, is not controlled by the operation or speed of the turntable 2 and, consequently, the speed of the tape between the rendition equipment or projector 6 and turntable 2 may be different from the speed that exists at the output of the capstan 8. Consequently, an accumulator 4 is provided between the capstan 8 and the rendition equipment such as projector 6. The accumulator 4 senses the change in speed of the tape by movement of rollers 33 and 34 which are coupled to a control element such as rheostat 220. The control element 220 controls the speed of the turntable 2, capstan 8 and agitator 15 to either speed up the operation or slow it down as required by the speed of the rendition equipment such as projector 6.

Figure 5:
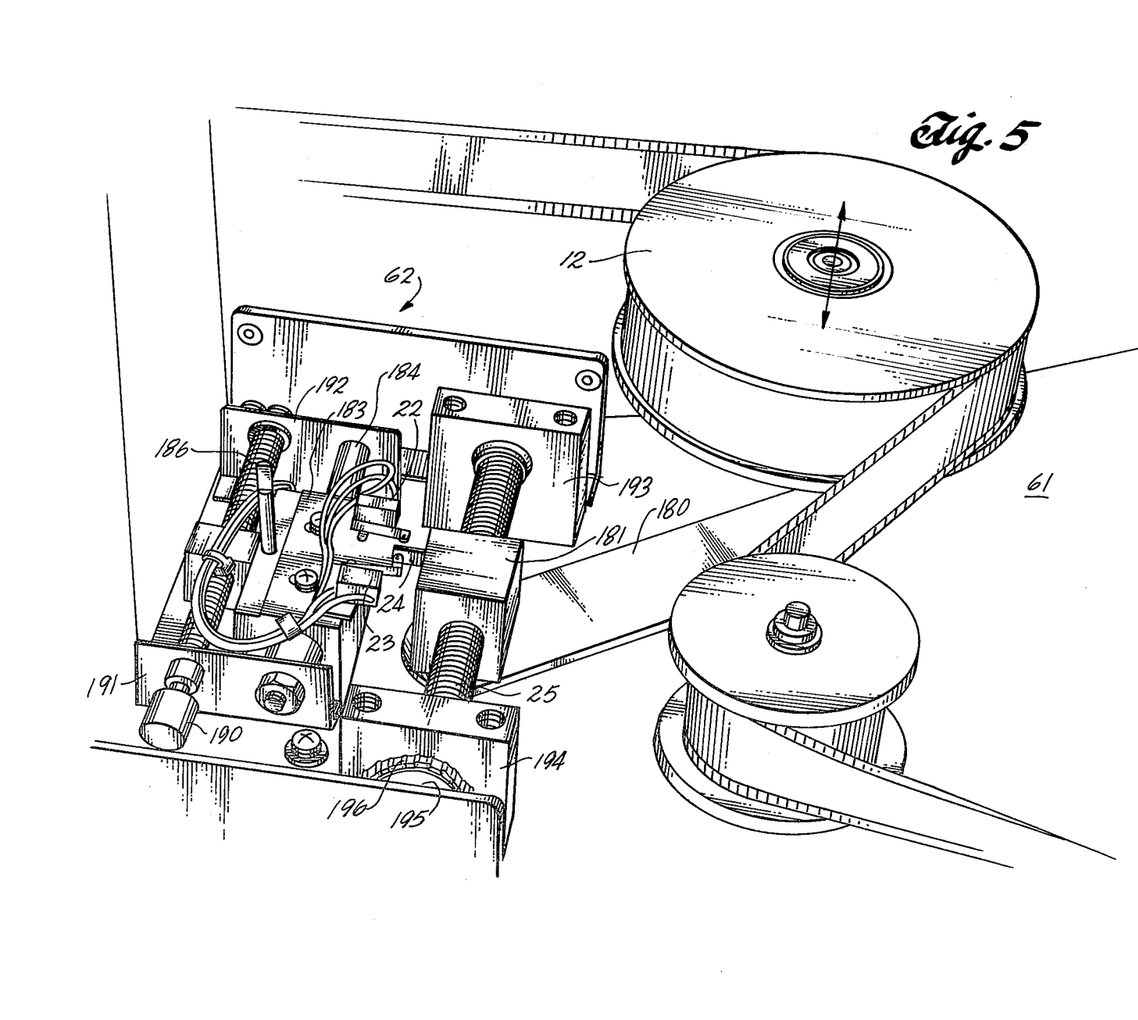
FIG. 5 is a three-dimensional view of the movable layup roller and its control mechanism.
Figure 6:
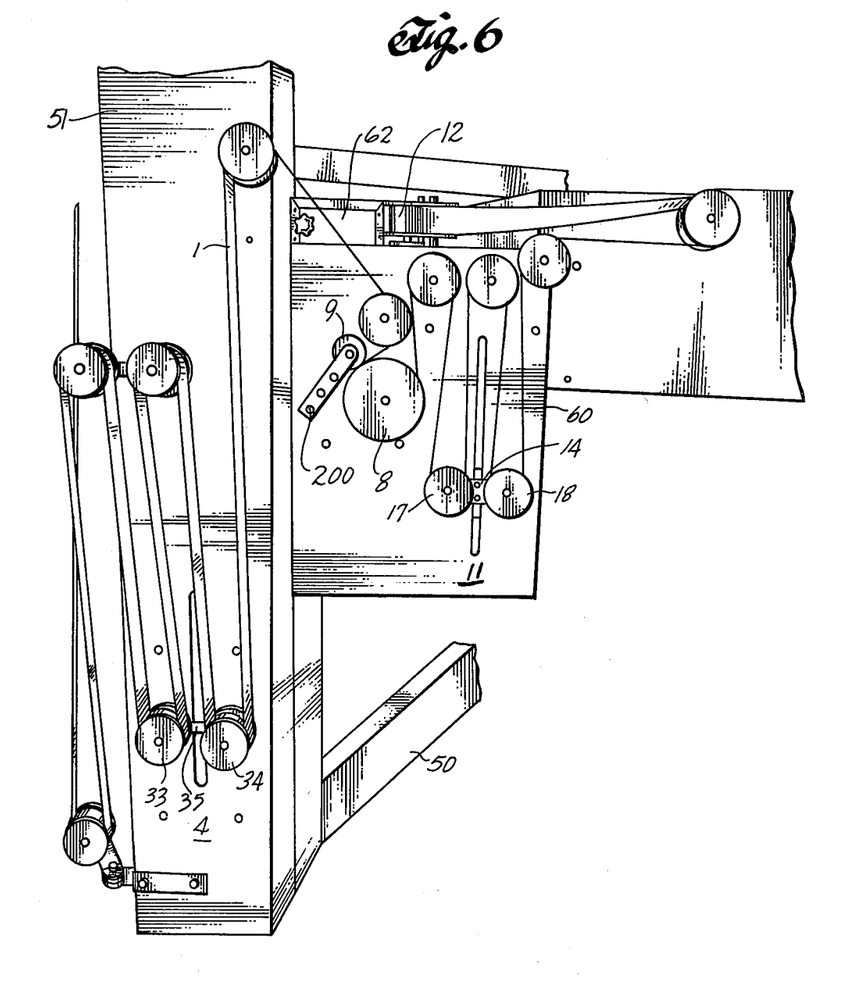
FIG. 6 is a side-elevation view of the capstan drive and two of the accumulators of the present invention.
Figure 7:
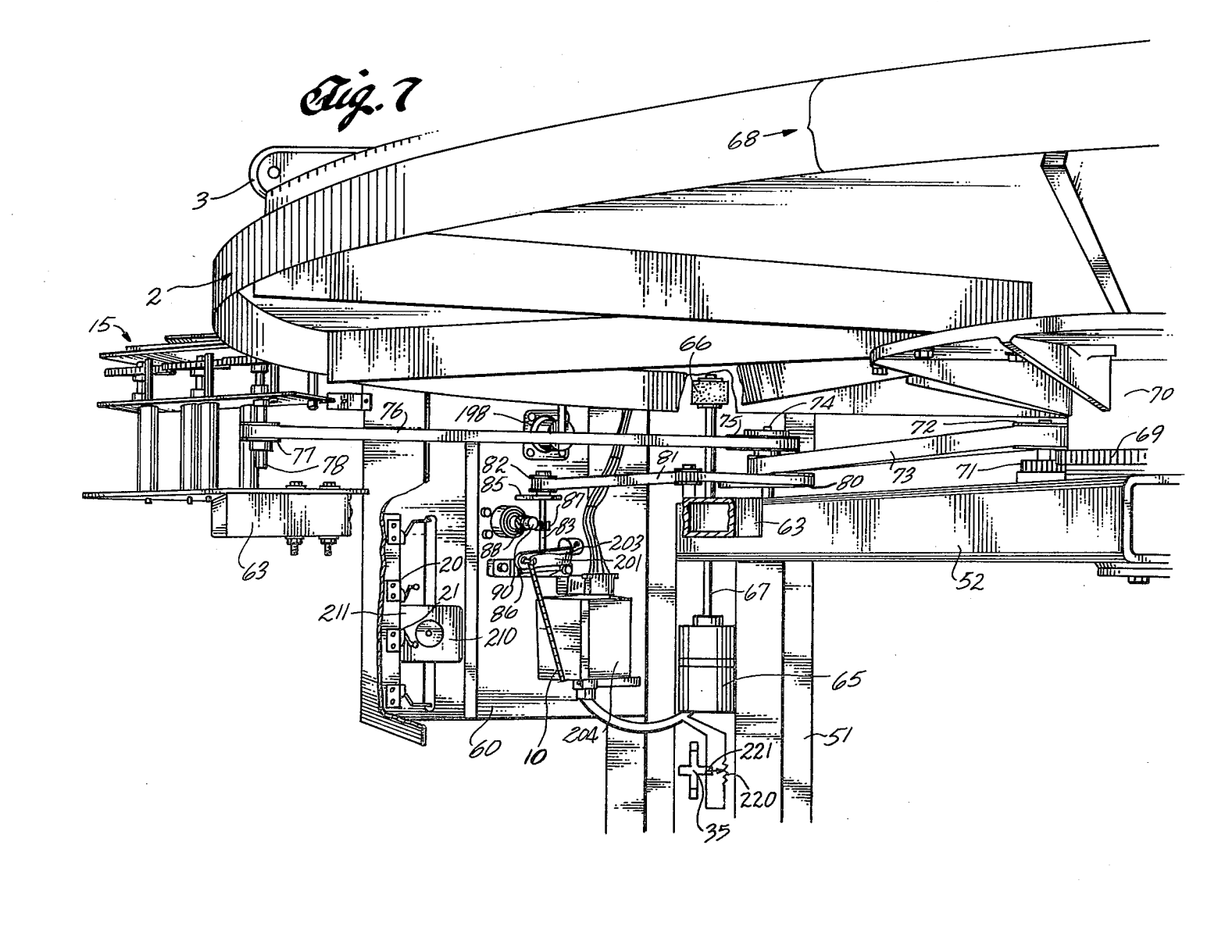
FIG. 7 is a three-dimensional view showing the drive mechanism for the turntable, agitator and capstan.

One particular embodiment of the method and apparatus for storing tape where the tape is movie film is shown in FIGS. 1 and 3 through 7. As shown in these FIGS., a turntable 2 for storing movie film is supported by a structure consisting of a base 50 and a vertical column 51. The turntable 2 is supported from vertical column 51 by an arm 52 (as shown in FIG. 7) that is welded to the vertical column 51, or otherwise attached to the column. The turntable 2 is mounted on the arm 52 for rotation through bearings (which are not shown) supported by the arm 52.

Also attached to the vertical column 51 is a vertical plate 60 (FIG. 6) having the capstan and accumulator 11 mounted thereon. On top of the plate 60 in a horizontal position near the edge of the turntable 2 and attached to the column 51 is a table 61 (FIGS. 3 and 5) on which is mounted the movable layup roller 12 and movement control device 62. An agitator 15 is mounted adjacent the edge of the turntable 2 by attachment to an arm 63 from the arm 52 which supports the turntable 2. As seen in the drawings, the agitator 15 is mounted near the movable layup roller 12, although it may be mounted anywhere around the turntable 2.

Referring to FIG. 7, a motor 65 is mounted in the channel of the vertical column 51 and a pinch roller 66 is attached to a shaft 67 driven by the motor 65. The pinch roller 66 engages the outer periphery 68 of the turntable 2 so that the turntable 2 is driven by the motor 65. Rotation of the turntable 2 drives the agitator 15 and the capstan 8 through gears and pulleys and belts, as shown in FIG. 7. In particular, there is a drive gear 69 mounted around the periphery of the column 70 at the base of the turntable 2. Drive gear 69 engages a gear 71, which drives pulley 72. Coupled to the pulley 72 is a belt 73 that drives a shaft 74. Attached to the shaft 74 is a top pulley 75 which drives the agitator 15 through a belt 76. Belt 76 is coupled to a pulley 77 mounted on a shaft 78 supported by the agitator 15, and mounted for rotation to drive the agitator 15.

Also attached to the shaft 74 is a lower pulley 80 which is employed to drive the capstan 8. The lower pulley 80 drives a belt 81 that is coupled to a pulley 82 mounted on a shaft 83. The shaft 83 is attached to the backside of the vertical plate 60 by brackets 85 and 86. Suitable bearings are provided, also attached to the mounts 85 and 86, for journaling the shaft 83. A gear 87, driven by the shaft 83, is coupled to a companion spiral gear 88 that is mounted on the shaft 90 that is attached to the capstan 8.

Thus, the main power source for the apparatus for storing film is the motor 65 which drives the turntable which, in turn, drives the capstan 8 and agitator 15.

Figure 8:
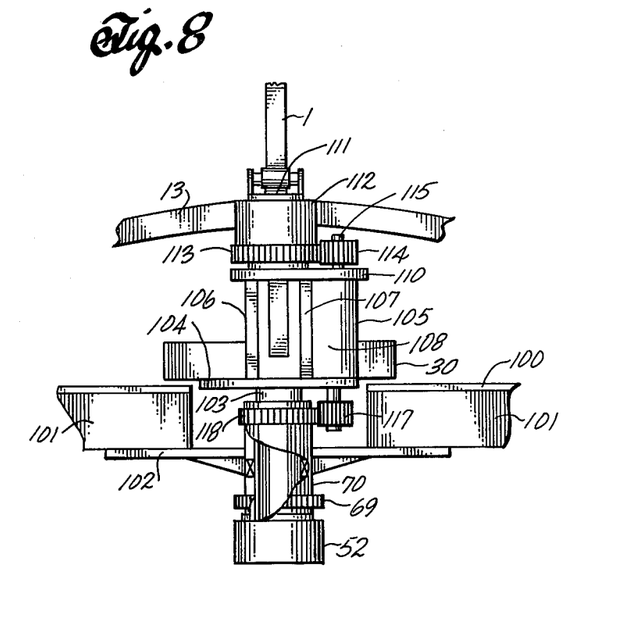
FIG. 8 is a cut-away view at the center of the turntable showing the drive for the upper pressure-pad carrier.

The turntable 2 also drives the pressure pads 3 and their carrier 13, as shown in FIG. 8 of the drawings. Turntable 2 has a plate 100 attached to and supported by ribs 101 on the underneath side thereof. The ribs 101 are attached to and supported by a plate 102 which is attached to the column 70. Passing through the column 70 is a hollow support structure 103 that rests on and is attached to the arm 52. The support structure 103 supports a plate 104 in the middle of the turntable 2. Attached to the plate 104 is the circular tray 30 and a support member 105. The support member 105 consists of two vertical plates 106 and 107 and a cylindrical housing 108 on the side of the plate 107. By this construction, there is a hollow or open area through which the tape 1 passes as it is being drawn from the table 2. At the top of the vertical plates 106 and 107 and the cylindrical housing 108 is a cover plate 110 which supports a shaft 111. The shaft 111 supports the pressure-pad carrier 13 and the central hub 112 of the pressure-pad carrier 13. The central hub 112 is journaled around the shaft 111 for rotation about the shaft 111 and the stationary elements in the center of the turntable 2. At the bottom of the collar 112 is a gear 113 which is driven to drive the carrier 13 and pressure pads 3 in synchronism with the turntable 2. The gear 113 engages a gear 114 attached to a shaft 115 that is housed in the cylindrical housing 108.

At the lower end of the shaft 115 is attached a gear 117 that is driven by a gear 118 attached to the column 70 in the central portion of the turntable 2. Through the gearing shown in FIG. 8, the turntable 2, which is driven by the pinch roller 66, causes the gear 118 to rotate, which causes the gears 117 and 114 to rotate to drive the gear 113 attached to the pressure-pad carrier 13 through its central column 112.

Figure 3:
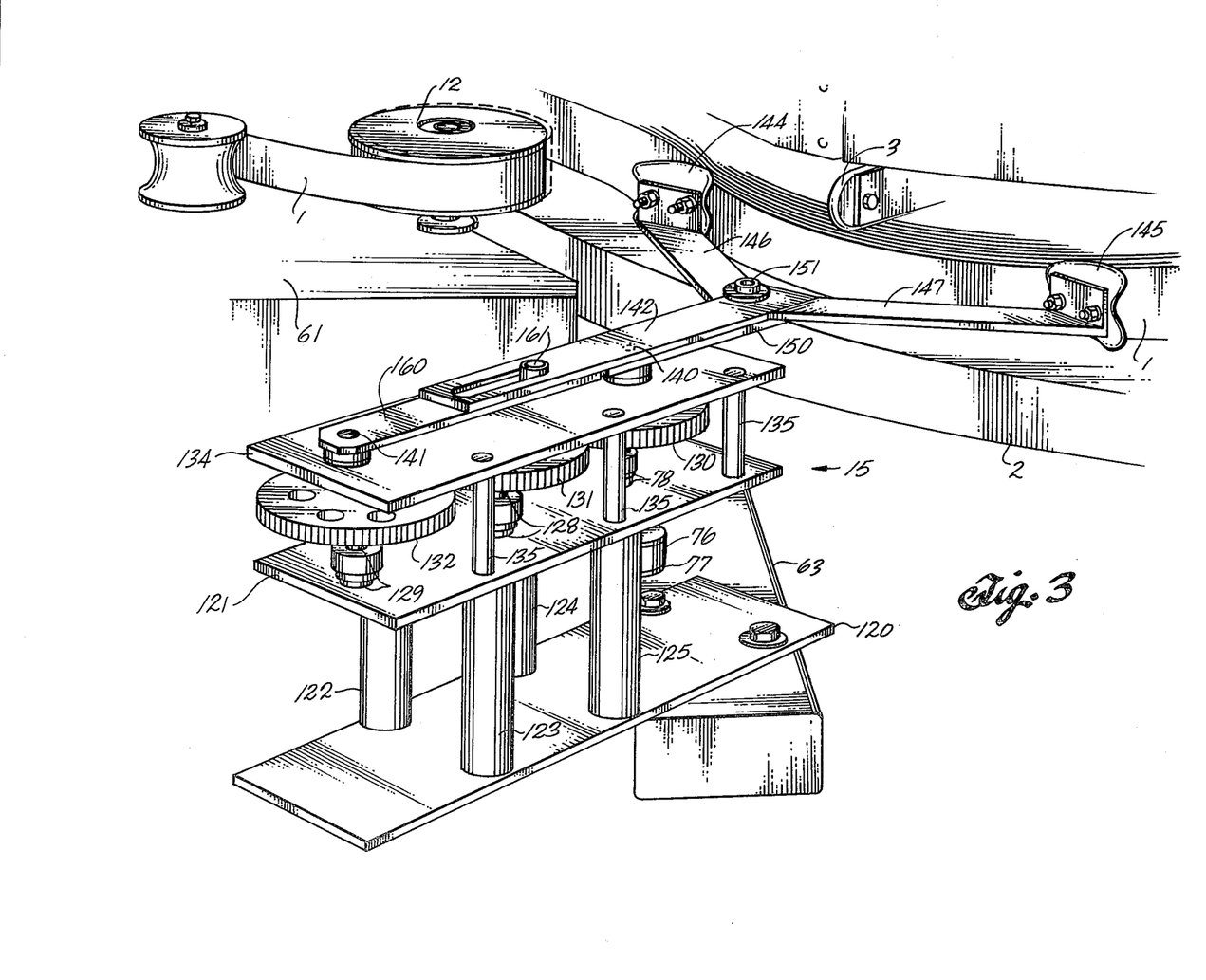
FIG. 3 is a three-dimensional view of the agitator and layup roller of the present invention.
Figure 4:
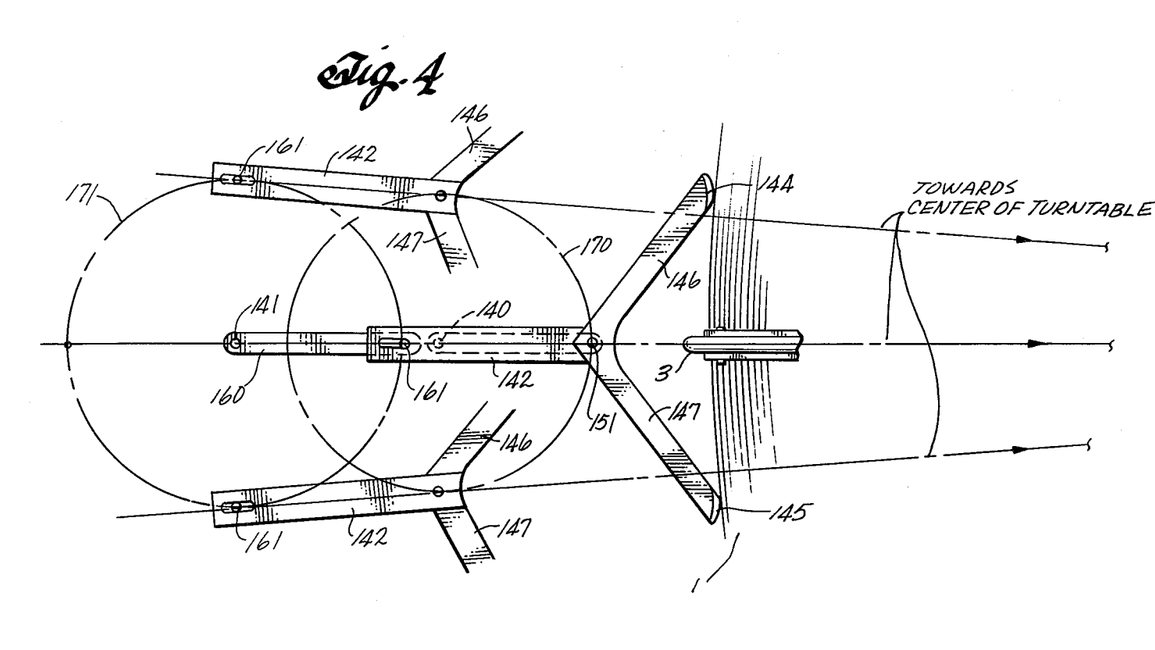
FIG. 4 is a schematic diagram showing the various positions of the agitator of FIG. 3.

To break up any undesirable forces and to aid in the formation of the scallops between adjacent radii associated with the pressure pads 3, the agitator 15 operates in synchronism with the turntable 2. Agitator 15 consists of a support plate 120 attached to the arm 63. The support plate 120 supports a second support plate 121 through four posts 122 through 125. On top of support plate 121 are journaled three shafts with gears attached for driving the agitator 15. A first shaft 78 has a gear 130 attached thereto, which drives the other two gears 131 and 132. Gear 130 is driven through shaft 78 which is coupled to the pulley 77 which is driven by the belt 76. A third plate 134 is supported above the second plate 121 through vertical columns 135. Shafts 78, 128 and 129 are journaled in the two support plates 121 and 134. Gear 130 drives a pivot pin 140 (which may be the upper end of shaft 78) through shaft 78, and gear 132 drives a pivot pin 141 (which may be the upper end of shaft 129) through shaft 129. A main bar 142 is mounted above the support plate 134 for movement about the support plate to move into contact with the tape on the turntable 2 as a pressure pad 3 is moving past the agitator 15.

Feet 144 and 145 which contact the tape 1 on the turntable 2 are attached to and supported by arms 146 and 147, which are attached to and carried by the main bar 142. A first drive rod 150 is coupled between the drive pin 140 and a drive pin 151 at the opposite end of the rod, with the drive pin 151 being coupled to the main bar 142. A second drive rod 160 is also coupled to the main bar by a drive pin 161. The second drive rod 160 is driven by the drive pin 141 through the gear 132. The movement of the agitator in contacting the tape and aiding in the formation of scallops and, while out of contact with the tape, is diagramatically shown in FIG. 4. The path of the pivot pin 151 is shown by the dashed circle 170, while the path of the pivot pin 161 is shown by the dashed circle 171.

The agitator is so designed that the center line of the main bar 142 passes through the center of the turntable 2 at all times. In this way, the force against the tape, when the agitator is in contact with the tape and moving into the tape, is toward the center of the turntable. The movement of the agitator 15 is synchronized with the rotation of the turntable 2 so that each time a pressure pad 3 passes by the agitator 15, the agitator moves into contact with the tape to break up any forces and to aid in the formation of scallops. The feet 144 and 145 of the agitator contact the tape equidistant from the radius line associated with the pressure pad passing by the agitator.

The movable layup roller 12 is mounted to operate between two limits. The roller 12 may be moved between these two limits linearly or in a stepwise function. The movement control device 62 shown in FIG. 5 moves the movable layup roller 12 in a linear manner between the two extremes or limits of its movement. The layup roller 12 is rotatably mounted on a bar 180 that is connected to a block 181, movable along a lead screw 25. An arm 24 extends from the block 181 between two microswitches 22 and 23 which control the limit of the movement of the layup roller 12. The distance between the microswitches 22 and 23 may be adjusted to vary the travel of the layup roller 12, and the position of the microswitches 22 and 23 may also be adjusted to vary the position of the layup roller relative to the center of the turntable 2.

The microswitches 22 and 23 are mounted on a block 183 which is slidably mounted on a shaft 184. The position of the block 183 is controlled by a lead screw 186 that is rotatably mounted between the walls 191 and 192 inside the control device 62 and which may be adjusted by a knob 190 outside the walls 191 and 192.

Lead screw 25 is rotatably mounted in bearing blocks 193 and 194 and extends through bearing block 194 where it is coupled to a pulley 195. Pulley 195 is driven by a belt 196 that extends through the table 61, where it is attached to the shaft of a drive motor 198 (FIG. 7). Drive motor 198 is attached to the vertical plate 60 below table 61 and the movement control device 62. The operation of the motor 198 is under the control of microswitches 20 and 21 of the accumulator 11.

When the movable layup roller 12 is closest to the center of the turntable 2, it is applying the shortest length of tape per revolution of the turntable and, when in the position remote from the center of the turntable, it applies the longest length of tape per revolution of the turntable. In this way, the circumference of the outer layers of tape applied to the turntable per revolution thereof are at a first or second selected length. Additionally, the length per revolution may vary between the two selected lengths if a movement control device, such as the device 62 having the lead screw 25, is employed to move the layup roller between its two positions.

Alternatively, the layup roller may be operated in a position between two limits in response to means for continuously sensing the tape accumulated between the capstan 8 and layup roller 12 and for providing an output signal in response to the variations in the accumulation of tape. To provide this continuous sensing, a potentiometer (not shown) may be coupled to movable rollers 17 and 18 so that the control voltages across the potentiometer will vary as the position of the rollers 17 and 18 varies in response to the variations in the accumulation of tape.

In operation, the tape is driven by the capstan 8 in cooperation with the pinch roller 9. The pinch roller 9 is rotatable by a shaft 200 that extends through and is rotatably mounted on the vertical plate 60 and is connected to an arm 201 behind the plate 60. The arm 201 is spring-loaded by a spring 10 connected between the end of the arm 201 by a screw 203 and the bottom of a control box 204. The capstan 8 moves the tape at a constant speed relative to the speed of the turntable 2. The system is so adjusted that when the movable layup roller is in its innermost position nearest the center of the turntable 2, less tape is required than is being provided by the capstan 8. Consequently, the excess tape is accumulated on the accumulator 11. The accumulator 11 maintains a substantially constant tension in the tape between the capstan 8 and the turntable 2 by the weight of the rollers 17 and 18 and their common carriage 14. As the layup roller applies less tape than is available from the capstan 8, the rollers 17 and 18 move downward to accumulate the tape and to maintain the tension on the tape. Attached to the carrier 14 at the back of the vertical plate 60 is a roller 210 (schematically shown as arm 19 in FIG. 2) carried by a plate 211 and positioned relative to microswitches 20 and 21 to engage the switches as the rollers 17 and 18 move up and down with the operation of the accumulator 11. With the layup roller 12 in its position nearest the center of the turntable 2, the accumulator 11 is taking up the excess tape so that the rollers 17 and 18 are moving downward along the vertical plate 60. As the rollers 17 and 18 move down, the roller 210 contacts microswitch 21, which energizes the motor 198. The energization of motor 198 causes the lead screw 25 to be turned to move the layup roller 12 from its innermost position to its outermost position relative to the center of the turntable 2. When the layup roller 12 reaches its outermost position as detected by the arm 24 making contact with the microswitch 23, the motor 198 is turned off and the layup roller remains in this position for an interval of time.

While operating in the outermost position relative to the center of the turntable 2, the layup roller 12 applies the longest length of tape per revolution of the turntable and feeds the tape onto the turntable at a rate faster than the tape is supplied by the capstan 8. Consequently, the additional tape required by the layup roller in its outermost position is supplied by the accumulator 11. In supplying this tape, the rollers 17 and 18 move up, and the roller 210 at the back of the vertical plate 60 contacts the upper microswitch 20. When upper microswitch 20 is contacted, the motor 198 is again energized and the lead screw moves in the opposite direction to cause the block 181 and layup roller 12 to move inward toward the center of the turntable 12. When the arm 24 extending from block 181 contacts the microswitch 22, the motor 198 is turned off and the layup roller remains in this position for an interval of time, until the rollers 17 and 18 of the accumulator 11 move down to where the roller 210 contacts the lower microswitch 21 which starts the process over.

The movable rollers 33 and 34 attached to the carriage 35 (FIG. 6) control a rheostat 220 mounted on the inside of the channel of vertical column 51. The slidable arm 221 of rheostat 220 is connected to the source of the voltage (not shown) through the control box 204. One end of the rheostat 220 is connected directly to the motor 65 so that a variation in the position of the movable arm 221 causes a change in the rotational speed of the motor 65 and, thus, a change in the rotational speed of the turntable 2. In this way the difference in tape speed caused by the rendition equipment such as projector 6 and that caused by turntable 2 and its feed mechanism, including capstan 8, is corrected.

To keep the take-off point 27 within desired limits to prevent scratching of the film, microswitches 31 and 32 are mounted on either side of the opening in the circular tray 30 (FIG. 1). The microswitches 31 and 32 activate a motor which drives a lead screw 29 to adjust accumulator 5 by moving roller 28 in much the same way that the closing of either microswitch 20 or 21 activates motor 198 to turn lead screw 25 to move the layup roller 12. When the take-off point returns to be within the selected area, the microswitch is released to shut off the motor that is driving lead screw 29. A delay in shutting off the motor is included to cause the motor to slightly overdrive the lead screw 29 and roller 28 to cause the take-off point 27 to be closer to the center of the selected area. Thus, the movement of roller 28 of accumulator 5 causes a change in the amount of tape between the take-off point 27 and the rendition equipment and, thus, the desired change in the take-off point 27 to keep it within the selected area.

While certain features of this invention have been described in detail with respect to various embodiments thereof, it will, of course, be apparent that other modifications can be made within the spirit and scope of this invention, and thus the appended claims should not be necessarily limited to the description of the preferred embodiment.

What is claimed is:

1. A tape-handling unit comprising a turntable rotatable about an axis, means for holding a tape on edge against the turntable along a plurality of radii of the turntable and permitting movement of the tape radially along each radius while preventing circumferential movement of the tape across the radius, and means for agitating the tape about each radii to aid in the formation of scallops between adjacent radii of the holding means.

2. A tape-handling unit comprising a turntable rotatable about an axis, means for holding a tape on edge against the turntable along a plurality of radii of the turntable and permitting movement of the tape radially along each radius while restricting circumferential movement of the tape across the radius, and means for aiding in the formation of scallops in the inner loops of the tape between adjacent radii of the holding means.

3. A tape-handling unit in accordance with claim 2 wherein the aiding means comprises means in contact with the outer loop of the tape on each side of a holding means for pushing the tape inward on the table.

4. A tape-handling unit in accordance with claim 3 wherein the aiding means further comprises means for moving the pushing means in the direction the tape is moving past the aiding means and at the same speed as the movement of the tape while the aiding means is in contact with the tape.

5. A tape-handling unit in accordance with claim 2 wherein the aiding means comprises:
a main bar;
a first drive rod of a selected length;
a second drive rod of a selected length;
means for pivotally connecting a first end of the main bar to one end of the first rod;
means for pivotally driving the other end of the first drive rod;
means for connecting one end of the second drive rod to the main bar with a pivot rod located in a slot along the length of the longitudinal axis of the main bar;
means for driving the opposite end of the second drive rod for rotational movement of the second rod in synchronism with the first drive rod; and
a pair of feet symmetrically attached to the end of the main bar adjacent to the turntable.

6. A tape-handling unit comprising a turntable rotatable about an axis, means for holding a tape on edge against the turntable along a plurality of radii of the turntable and permitting movement of the tape radially along each radius while preventing circumferential movement of the tape across the radius, thereby forming scallops in the inner loops of the tape between adjacent radii, means for agitating the tape about each radii to break up the forces present on the table from the spirally wound tape that tend to enlarge the circumference of the outer loop of the tape and that tend to distort the symmetry of the scallops.

7. A tape-handling unit comprising:
a turntable rotatable about an axis;
means for holding tape on edge against the turntable along a plurality of radii of the turntable and permitting movement of the tape radially along each radius while preventing movement of the tape across the radius;
a movable layup roller for applying the tape at any selected circumference of the turntable in response to a control signal; and
means for generating the control signal.

8. A tape-handling unit in accordance with claim 7 wherein the generating means senses the amount of tape available to the layup roller relative to a selected amount of tape.

9. A tape-handling unit comprising a turntable rotatable about an axis, means for holding a tape on edge against the turntable along a plurality of radii of the turntable and permitting movement of the tape radially along each radius while restricting circumferential movement of the tape across the radius, and a movable layup roller for applying the tape in a first position at a first selected circumference on the table for a first interval of time, and in a second position at a second selected circumference greater than the first circumference for a second selected interval of time, and means for moving the layup roller between the two positions.

10. A tape-handling unit in accordance with claim 9 further comprising a capstan drive for providing a selected length of tape to the layup roller for storage on the turntable per revolution of the turntable, and an accumulator between the capstan drive and the layup roller for taking up the excess tape when the layup roller is in its first position and for supplying tape when the layup roller is in its second position.

11. A tape-handling unit in accordance with claim 10 further comprising means associated with the accumulator for sensing the travel of the accumulator between two selected positions, and means responsive to the sensing means for causing the layup roller to change position each time the accumulator reaches one of the selected positions.

12. A tape-handling unit in accordance with claim 9 further comprising means associated with the turntable to provide removal of the tape from the turntable at the inner loop of the film stored on the turntable with the film being removed from the inner loop in a pre-selected area of the turntable to prevent sliding of the film upon removal, means for sensing the removal of the film outside the pre-selected area, and an accumulator responsive to the sensing means for adjusting the point of removal from the turntable.

13. A tape-handling unit in accordance with claim 10 wherein the tape is a film for use in a projector which drives the tape at a speed independent of the speed of the capstan and turntable, further comprising an accumulator between the projector drive and the capstan for sensing a change in the length of the film between the projector drive and the capstan, means responsive to the accumulator for changing the speed of the turntable and capstan drive upon the sensing of a change in the length of the film between the projector and the capstan drive from a pre-selected length of film.

14. A tape-handling unit comprising a turntable rotatable about an axis, means for holding a tape on edge against the turntable along a plurality of radii of the turntable and permitting movement of the tape radially along each radius while preventing circumferential movement of the tape across the radius, means for winding the tape on the turntable near the periphery of the turntable, means associated with the turntable to provide removal of the tape from the turntable at the inner loop of the film stored on the turntable with the film being removed from the inner loop in a pre-selected area of the turntable, the tape being removed from the turntable and wound on the turntable being joined in an off-turntable bight, means for sensing the removal of the film outside the pre-selected area, and an accumulator in the path of the off-turntable bight responsive to the sensing means for adjusting the point of removal from the turntable by adjusting the length of the off-turntable bight.

15. Method of storing a continuous-loop tape on a turntable for repetitive winding near the outer periphery and unwinding from near the center comprising the steps of winding onto a turntable one of two selected lengths of tape per revolution of turntable and lengths between the two selected lengths, the initial and following windings being sequentially wound near the periphery of the turntable with each winding displacing radially inward the preceding windings which become increasingly curved as the lengths thereof are constricted by progressively decreasing distance from the axis of the turntable, drawing the starting end from adjacent the center of the turntable, and joining the finishing and starting ends of the tape in an off-turntable bight.

16. A tape-handling unit comprising:
 a turntable rotatable about an axis;
 means for holding a tape on edge against the turntable along a plurality of radii of the turntable and permitting movement of the tape radially along each radius while preventing circumferential movement of the tape across the radius;
 means for agitating the tape about each radii to aid in the formation of scallops between adjacent radii of the holding means;
 a movable layup roller for applying the tape at any selected circumference of the turntable in response to a control signal;
 means for generating the control signal;
 means associated with the turntable to provide removal of the tape from the turntable at the inner loop of the film stored on the turntable with the film being removed from the inner loop in a pre-selected area of the turntable;
 means for sensing the removal of the film outside the pre-selected area; and
 an accumulator responsive to the sensing means for adjusting the point of removal from the turntable.

17. A tape-handling unit in accordance with claim 16 further comprising:
 a tape-drive means for providing tape to the layup rollers wherein the control signal generating means comprises an accumulator between the movable layup roller and tape drive means;
 means for sensing the travel of the accumulator to a first selected position and to a second selected position; and
 means responsive to the sensing means for producing the control signal.

* * * * *